(12) United States Patent
Boyce

(10) Patent No.: US 8,745,921 B2
(45) Date of Patent: Jun. 10, 2014

(54) POTTED PLANT LOCK

(76) Inventor: Daniel E. Boyce, Lake Forest, IL (US)

(\*) Notice: Subject to any disclaimer, the term of this patent is extended or adjusted under 35 U.S.C. 154(b) by 505 days.

(21) Appl. No.: 13/030,538

(22) Filed: Feb. 18, 2011

(65) Prior Publication Data

US 2011/0215062 A1 Sep. 8, 2011

Related U.S. Application Data

(60) Provisional application No. 61/311,025, filed on Mar. 5, 2010.

(51) Int. Cl.
*A01G 9/02* (2006.01)

(52) U.S. Cl.
USPC .................................. 47/86; 47/84; 206/560

(58) Field of Classification Search
USPC ............. 47/86, 84, 65.5, 73, 75, 71; 206/560, 206/565

See application file for complete search history.

(56) References Cited

U.S. PATENT DOCUMENTS

| 1,688,888 | A | * | 10/1928 | Spreen | 249/120 |
|---|---|---|---|---|---|
| 1,950,203 | A | * | 3/1934 | Wilson | 206/1.8 |
| 1,962,556 | A | * | 6/1934 | Eberhardt, Jr. | 206/562 |
| 3,965,616 | A | | 6/1976 | Ridgeway | |
| 4,315,382 | A | | 2/1982 | Kay et al. | |
| 4,793,097 | A | * | 12/1988 | Whitcomb | 47/86 |
| 4,999,946 | A | | 3/1991 | DeGiglio et al. | |
| 5,022,183 | A | | 6/1991 | Bohlmann | |
| 6,510,653 | B1 | | 1/2003 | Workum et al. | |

\* cited by examiner

*Primary Examiner* — Kristen C Hayes
(74) *Attorney, Agent, or Firm* — Glen M. Diehl

(57) ABSTRACT

A tray has a plurality of receptacles. A receptacle is enabled to receive a container with a locking device. The container contains a potted plant. The locking device contains a protrusion, the protrusion being a protrusion on a wall of the container when the locking device is in a neutral position. The protrusion can move inwards and outwards from the neutral position relative to the wall when an inward or outward force is applied. The container is in a secured position in the receptacle when the protrusion mates with an opening in the receptacle. The protrusion has a slanted side allowing the protrusion to be lifted from the opening by rotating the container around a vertical axis.

7 Claims, 18 Drawing Sheets

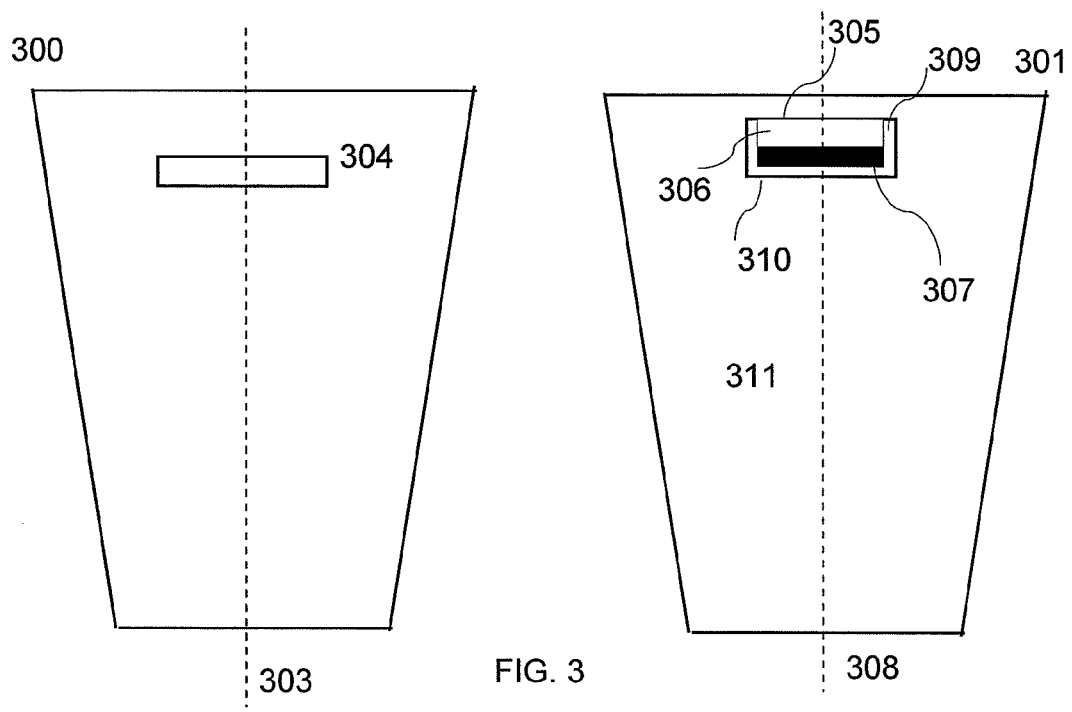
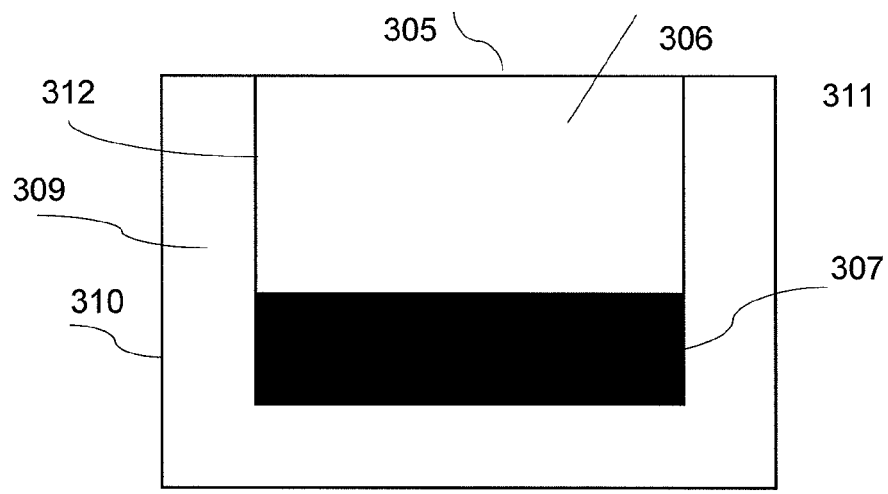
FIG. 4
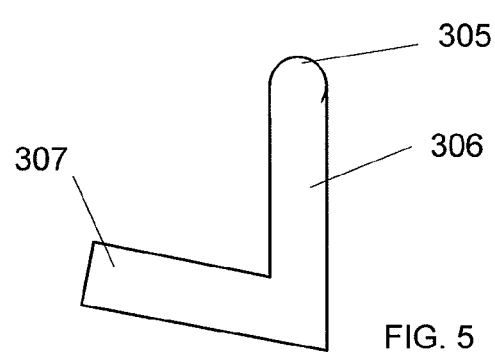
FIG. 5

POTTED PLANT LOCK

CROSS-REFERENCE TO RELATED APPLICATIONS

This application claims the benefit of U.S. Provisional Patent Application Ser. No. 61/311,025 filed on Mar. 5, 2010 which is incorporated herein by reference in its entirety.

BACKGROUND OF THE INVENTION

The present invention relates to a locking mechanism and system. More in particular it relates to a locking mechanism and system for securing a pot or container containing a plant in a tray enabled to hold a plurality of pots or containers.

Potted plants are sold at retail outlets in containers that are held in a tray. In general a tray may hold two or more containers such as a pot, each container containing at least one potted plant. A consumer may buy a tray with a plurality of plants to replant the plants into a garden. A tray may contain a plurality of the same species of plant, such as perennials. It is known that potential buyers compare the visual appearance of plants located in a single tray. It is unavoidable that some plants on the tray are bigger and appear to be healthier than other plants. Potential buyers often switch what they believe to be one or more less desirable plants on the tray with what are believed to be healthier plants on another tray to create, what often wrongfully is believed to be a better tray of potted plants. In many cases the potential buyer will just pick a pot from a tray without properly replacing it.

This exchange and/or removal of pots on trays is often unwarranted and does in fact not create a better quality tray. The quality of all plants on a tray is often guaranteed by the seller, and what potential buyers see as a lesser quality of plant is in most cases a natural variation in for instance size and appearance. The difference of appearance at this stage of the life of a plant may indicate little about the viability of a plant once it is re-planted into garden soil. It is well known in the industry that once correctly replanted most if not all of the potted plants will be viable and that for instance appearance at this early stage says little about later performance of a plant.

An unfortunate result of this exchanging of plants from trays is that many trays are left with an incomplete number of pots or are left with for instance only relatively smaller sized plants. Those trays are ignored by potential buyers and often end up as waste. It is known in the industry that this consumer behavior may leave up to 25% of the plants that are sold in trays as waste. Such waste is unjustified as the majority of the thus discarded potted plants were completely viable products.

It is desirable to change the behavior of potential buyers by making it difficult to remove a pot from a tray to create an opening to insert another pot removed from another tray. Such prevention of removing a pot or container from a tray will contribute to substantially reducing the number of discarded plants and unjustified waste.

Accordingly, novel and improved methods and devices to lock or to secure a container with a plant in a tray containing a plurality of potted plants are required.

SUMMARY OF THE INVENTION

One aspect of the present invention presents a novel method and system for a lock or that secures a pot or container in a tray containing a plurality of containers.

In accordance with a further aspect of the present invention, a potted plant holder is provided that includes a tray having a plurality of receptacles wherein each of the receptacles in the tray having first lock device, a container containing a potted plant wherein the container has a second lock device and the first lock device in the tray mates with the second lock device in the container to secure the container in one of the plurality of receptacles.

When the second lock device is in a neutral position on the container, it can include a protrusion or lip that protrudes outwards from the container. The protrusion can be attached to a movable tab that is attached to a wall of the container. The movable tab can be enabled to move outwards and inwards from an opening in the wall of the container.

The first lock device in the receptacle can be an opening enabled to receive the protrusion to secure the container in the receptacle in a secured state.

In accordance with one aspect of the present invention, the protrusion cannot be removed from the opening in the receptacle by moving the container relative to the receptacle.

The protrusion can have at least one edge that is slanted at an angle with the tab that enables the protrusion to be lifted out of the opening of the container when the container is rotated about a vertical axis. The angle can be about 45 degrees.

The container and tray can made of a polymer material in accordance with one aspect of the present invention.

The present invention also provides for a method of securing a container having a potted plant to a receptacle in a tray.

The method, in accordance with one aspect of the present invention, includes the steps of placing the container having a potted plant in dirt and having a first lock device in one of a plurality of receptacles in the tray, positioning the container in the receptacle wherein the first lock device mates with a second lock device in the receptacle; and securing the container in the receptacle by securing the first lock device to the second lock device.

DESCRIPTION OF THE DRAWINGS

FIG. 3 illustrate a receptacle of a tray and a container for a potted plant in accordance with an aspect of the present invention;

FIGS. 4-8 illustrate a locking device of a container for a potted in accordance with an aspect of the present invention;

DESCRIPTION OF A PREFERRED EMBODIMENT

Figure 1:
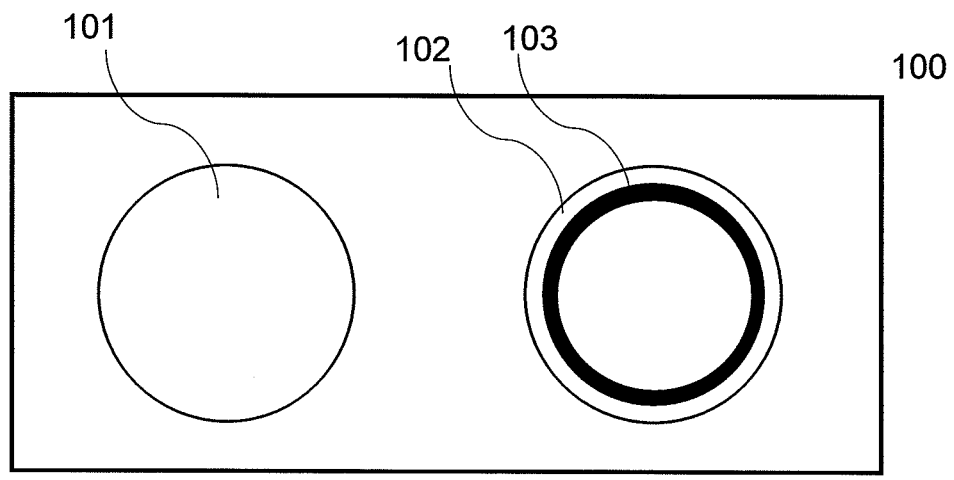
FIGS. 1 and 2 provide a diagram of a tray with a plurality of receptacles and a container for a potted plant.

It is an aspect of the present invention to provide a locking device on a pot for a potted plant in a tray enabled to hold a plurality of pots. The locking device will prevent a pot from being removed from the tray. Such a lock will prevent a potential customer to create a tray of potted plants by picking and choosing from different trays and leaving other trays partially filled. FIG. 1 illustrates in diagram a tray 100 for holding two containers with plants, which are containers with a circular cross section. It is to be understood that a tray can hold more than 2 containers. For instance a tray can hold 3 or more containers. Furthermore, the tray 100 is shown in FIG. 1 in top view having a rectangular cross section. This is not required. A tray may have any top view cross section that is enabled to hold containers. Furthermore, the tray 100 is shown to have two openings, 101 and 102 enabled to receive a container. The cross section in top view of 101 and 102 are circular as an illustrative example. This is not required. However, if one wants to lock as well as unlock a container from a tray, a non-rectangular cross section such as a circular top view cross section or an ellipsoid top view cross section of a container may be a preferred.

Figure 2:
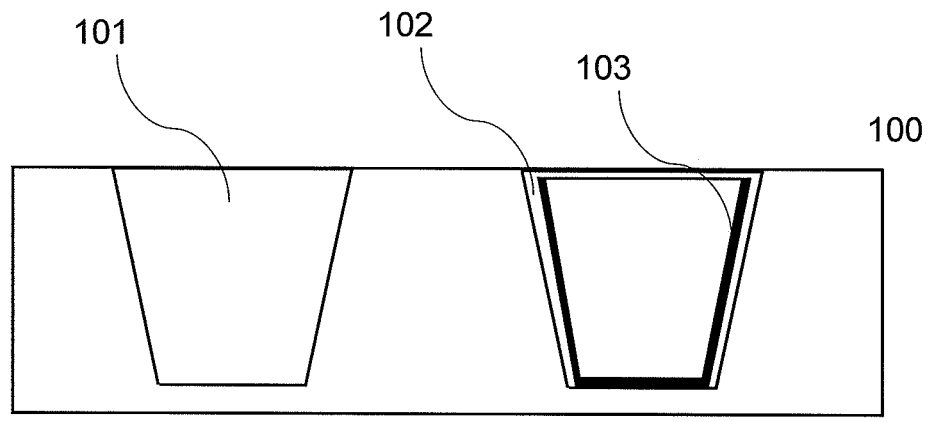

Opening 102 is shown with a pot 103 placed inside the tray opening 102. To further illustrate a tray FIG. 2 shows tray 100 with openings 101 and 102 and with opening 102 receiving a pot 103 in a side view cross section. The openings 101 and 102 are preferably tapered. Depending on the shape of the pot 103, the bottom of the pot 103 touches the bottom of the opening if there is a bottom wall in the tray opening. In general, the containers and the openings in a tray are dimensioned in such a way that the walls of the container will touch the vertical wall of the opening. Because of a tapered shape a container will be held inside the opening along the vertical walls even if the opening has no bottom wall.

A tray may be made of one of different materials. In general the tray material should be relatively sturdy to hold its shape even when exposed to weather and water. Preferably it is light, inexpensive and easy to stack when not holding plants. Examples of materials are: plastic or any other polymer, carton, pressed paper, wood, clay, metal or any other material that can be applied to form a tray. Trays can be manufactured by using a process including stamping, pressing, casting, molding, bending, thermo molding, bonding, welding, assembly, or any other process that can be used to form a tray.

A tray in one embodiment of the present invention holds one row of containers. In a further embodiment of the present invention a tray holds a plurality of rows of containers. A tray can be formed in such a way that it substantially follows the shapes of the containers it intends to hold by a thin wall. The tray in such an embodiment of the present invention has very little material between the opening that hold a pot or a container and looks somewhat like an egg container. An outside shape of the tray reflects a shape of a pot.

A tray in a further embodiment of the present invention is made from material in such a manner that the inside of the tray reflects and follows the shape of the pot, but the outside of the receiving shape of the tray is of solid material and one is not able to deduct from the outside shape what the inside shape is.

FIG. 3 illustrates with 300 the inside shape of a tray that is enabled to receive a pot 301. FIG. 3 shows a cross sectional view of an empty receptacle 300 of the tray that is enabled to receive the pot 301. Because the receptacle is empty, the cross sectional view presents a view on the inside wall of the receptacle. The receptacle 300 has a slot or an opening 304. In an embodiment of the present invention wherein the receptacle has a thin wall, the opening 304 is cut or stamped from the wall. FIG. 3 further shows an outside view of a pot 301 with wall 311. The pot 301 has a lock that corresponds with the slot or opening 304 of tray receptacle. In one embodiment of the present invention a wall 311 of the pot or container 301 is a vertical wall or substantially vertical wall. A slanted vertical wall 311 of a pot will also be considered a vertical wall unless designated differently. The lock comprises a carrier or tab 306 which is connected at the top 305 with the wall 311 of pot or container 301. The tab 306 has a protrusion 307 that protrudes from the tab to the outside of the pot or container. The protrusion is of a size so that it can be received by the opening 304 in the tray when the receptacle 300 receives the pot 301 in the correct orientation so that 304 is positioned to receive 307.

The lock of pot 301 is illustrated in larger detail in FIG. 4 in frontal view. The carrier or tab 306 is connected at 305 with container wall 311. The tab and container in one embodiment of the present invention are of the same material, which is a flexible material. In that case in a further embodiment of the present invention, the tab 306 may be creating by cutting an opening 309 in wall 311 along for instance an outer line 310 and an inner line 312, thus creating tab 306 which is still connected to 311 at 305. Because the material is flexible the tab 306 can thus move inside and outside the container along line 305.

The tab 306 with protrusion 307 is shown in cross-section side vied in FIG. 5. The protrusion 307 is enabled to enter slot 304 in the receptacle 300 when positioned correctly. The tab 306 is connected with wall 311 at 309. As was described above the tab may be created by cutting or stamping or by any other effective way removing excess material 309 from the container, thus leaving the tab.

In one embodiment of the present invention a mold is created that leaves room for protrusion 307 to be an integrated part of a container when being formed. One may then remove material 309 from the container to create tab 306 with integrated protrusion 307 as is shown in FIG. 5. The connection 309 is in that case a part of the wall 311.

Protrusion 307 is shown as being connected to tab 306 under an acute angle. In a further embodiment of the present invention protrusion 307 is perpendicular to tab 306. In yet a further embodiment of the present invention protrusion 307 and tab 306 are integrated into a single element. In one embodiment protrusion 307 and tab 306 are different elements and 306 and 307 are fixed together. They can be fixed together by bonding 397 to 306, by using a connecting element such as a nail or a screw or the like, or by way of 306 having a receptacle to receive 307 or 307 having a receptacle to receive 306. For illustrative purposes 307 is shown as being substantially rectangular. In a further embodiment of the present invention the protrusion may have any shape that can be received by a slot. Such a shape can be rounded, curved, slanted, tapered or any other shape that is advantageous for being received by a slot 304 in the receptacle.

Figure 6:
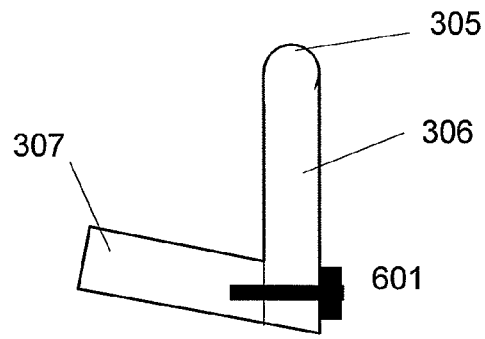

In another embodiment of the present invention, shown in FIG. 6, the protrusion 307 and the tab 306 are separate elements and they are connected to each other, for instance by using a screw 601 or any other mechanical connection, including nails, staples or any other mechanical means. In another embodiment of the present invention 306 and 307 are connected by bonding or connecting or otherwise joining the two parts together.

Figure 7:
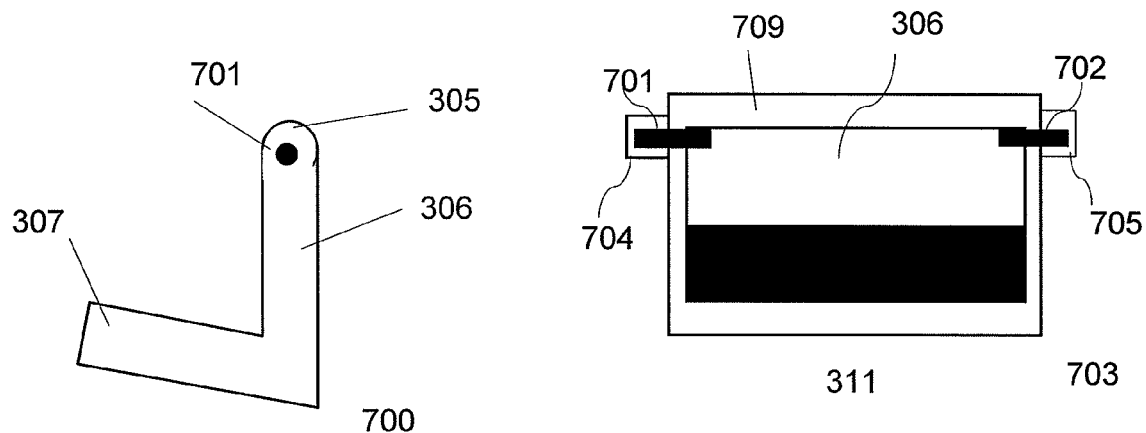

It may be that pot or container 301 and tab 306 are of different materials. For instance the container 301 may be of a substantially inflexible material such as a ceramic material. In that case in a container 301 a hole is created in wall 311 wherein a tab with a protrusion can be attached as a separate item to the wall 311 of container 301. This is illustrated in FIG. 7. A hole 709 in created in wall 311 of container 301. The tab 306 is provided with hinges 701 and 702. Diagram 700 of FIG. 7 shows the tab with one hinge 701 in cross sectional side view. Diagram 703 shows the tab 306 in hole 709 with hinges 701 and 702 attached which can be received by holes 704 and 705 and thus allow the tab 306 to swing or to move inward and outward of the pot or container 301.

Figure 8:
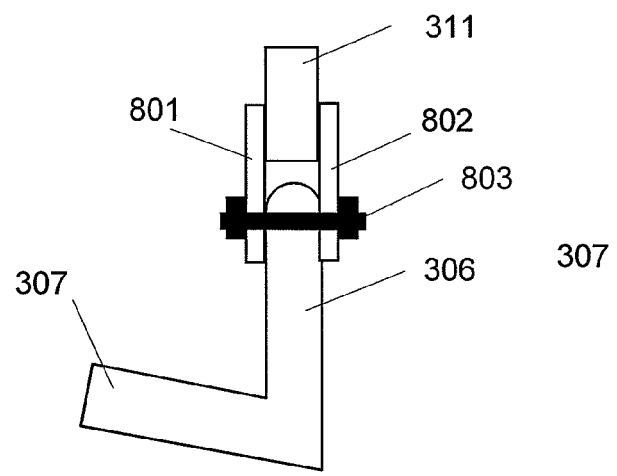

In another embodiment of the present invention the container has a hole or opening that allows the attachment of a tab 306 to a wall 311 of a container 301. The tab 306 is connected to the wall 311 by a flexible connecting piece material 801 or by a first flexible piece material 801 and a second piece of flexible material as illustrated in FIG. 8. The piece of material may be a strip of material 801 that is bonded or glued to both the wall 311 and the tab 306 as is illustrated in FIG. 8. One may also apply a fastener 803 to fasten the strip of material 801 to the tab. Though not shown one may also use a fastener to connect the strip of material 802 to the wall 311 and thus connect the tab 306 to the wall 311. A fastener may be a screw, a pin, a staple, or any other fastener that can hold different pieces of material together. A second strip 802 may not be needed. A second strip 802 in another embodiment of the present invention can be applied, but is manufactured from a more flexible material to allow the movement of the tab 306 inwards and outwards of the container.

Other constructions to attach a tab with a protrusion in a hole in a wall of a container to allow the tab to move inwards and outwards of the container are possible and are fully contemplated. Also different shapes of openings and tabs are possible even though the shapes are shown as rectangular herein.

A protrusion is shown in FIG. 8 at having an angle of about 10 degrees to the tab. The protrusion may have different angles and sizes in different embodiments of the present invention. One purpose of the protrusion is to secure the container in the tray by the protrusion mating with the tray through an opening in the wall of the tray. Once the protrusion has moved through the opening in the tray the container has become restricted in the ability to being moved in a reversed direction, and the container is secured in the tray.

Figure 9:
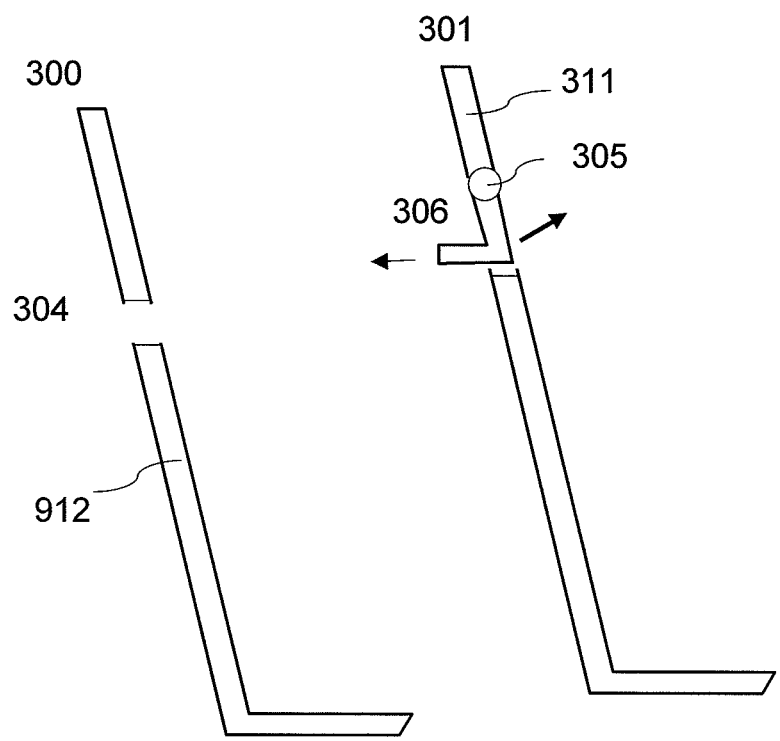
FIGS. 9-12 illustrate a combination of a container with a potted plant and a receptacle of a tray to secure the container in the receptacle in accordance with an aspect of the present invention.
Figure 10:
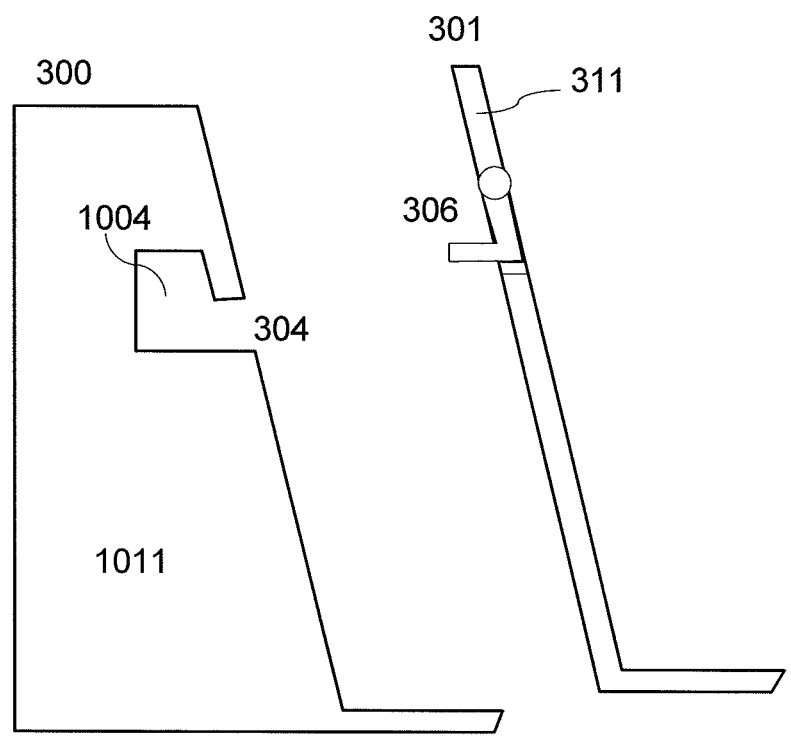

The securing of a container in a tray by using the tab with protrusion in the container and an opening in the tray is further illustrated in FIGS. 9-12. FIG. 9 illustrates in diagram a partial cross sectional view of the tray receptacle 300 and container 301 as shown in side view in FIG. 3 along viewing lines 303 and 308 in FIG. 3. The tray receptacle 300 with opening 304 is ready to receive container 301 with wall 311 and tab 306 with a protrusion attached to the wall, which is preferably a vertical wall. The tab 306 is enabled to move inwards of the container and outwards by rotating at attachment 305 to the wall 311. The tray receptacle is drawn in FIG. 9 as having a thin wall 911. A tray having a thin wall with an opening 304 is one embodiment of the present invention of a tray. It is an advantageous embodiment as it is light and easy to stack when empty. However, other embodiments of a tray with receptacles to receive containers with potted plants are fully contemplated. For instance, FIG. 10 illustrates an embodiment of the present invention of a tray with receptacles that are surrounded by a solid base environment 1011. There is an opening 304 to receive the protrusion of the tab 306 of the container. Because the base 1011 is solid, a cavity 1004 has been formed in this illustrative embodiment of the present invention to receive the protrusion of the tab.

Figure 11:
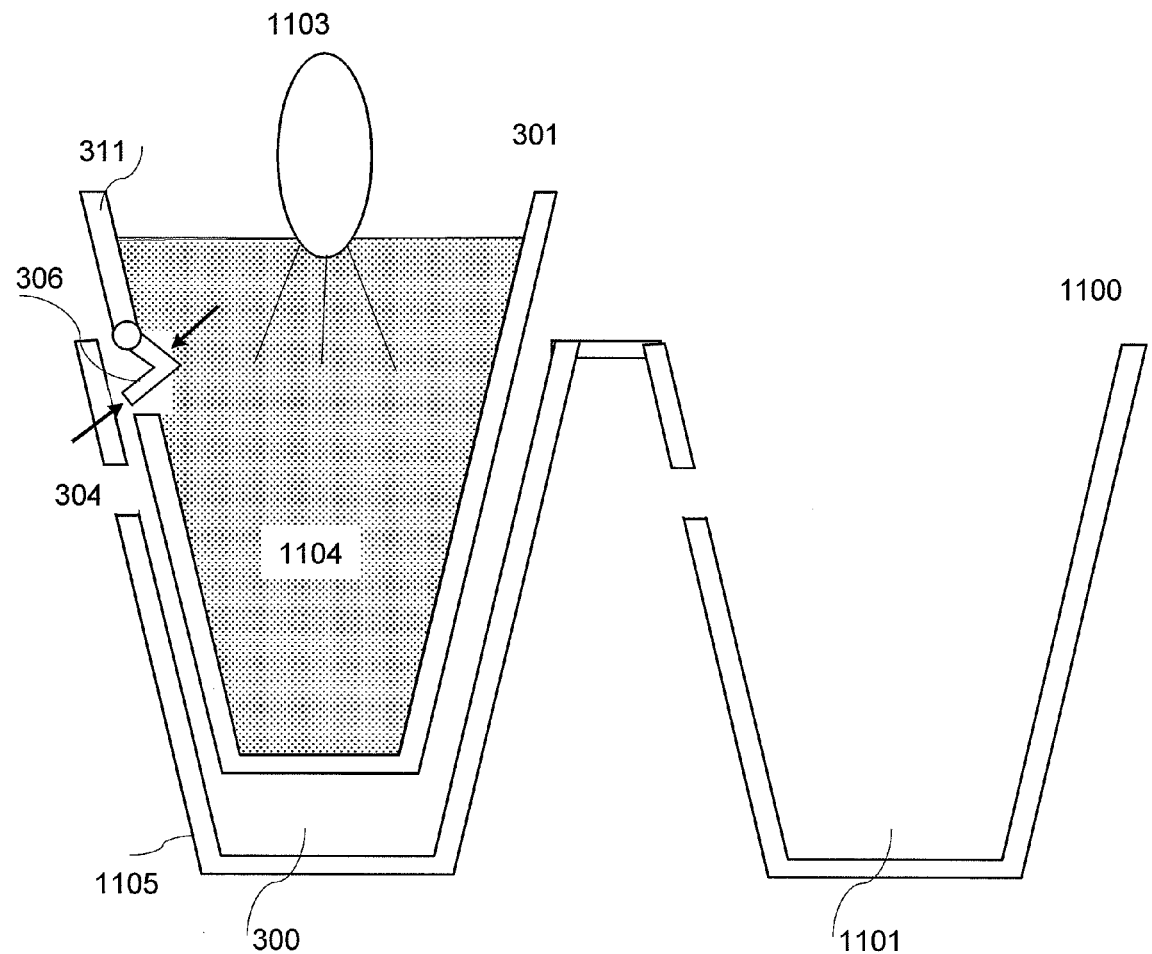

FIG. 11 illustrates in diagram a tray 1100 with a first receptacle 1101 and a second receptacle 300 to receive a container 301 filled with soil 1104 and planted in the soil 1104 a plant 1103 with roots. The compacted soil 1104 and the elasticity of the material of the tab and/or its connection to the container wall 311 pushes the tab in a neutral position that is about flush with the wall 311. If the tab is pushed inwards the container, countervailing forces try to push the tab back into its neutral position. In FIG. 11 the container 301 is moved into the receptacle 300. The protrusion of tab 306 in container 301 is pushed inwards the container by the wall 1105 of the tray as the container is sunk into the receptacle 300. As long as the protrusion touches the wall 1105 the tab 306 has nowhere to go but inwards the container, even as the soil and elastic forces are pushing back on the tab as is shown in FIG. 11.

Figure 12:
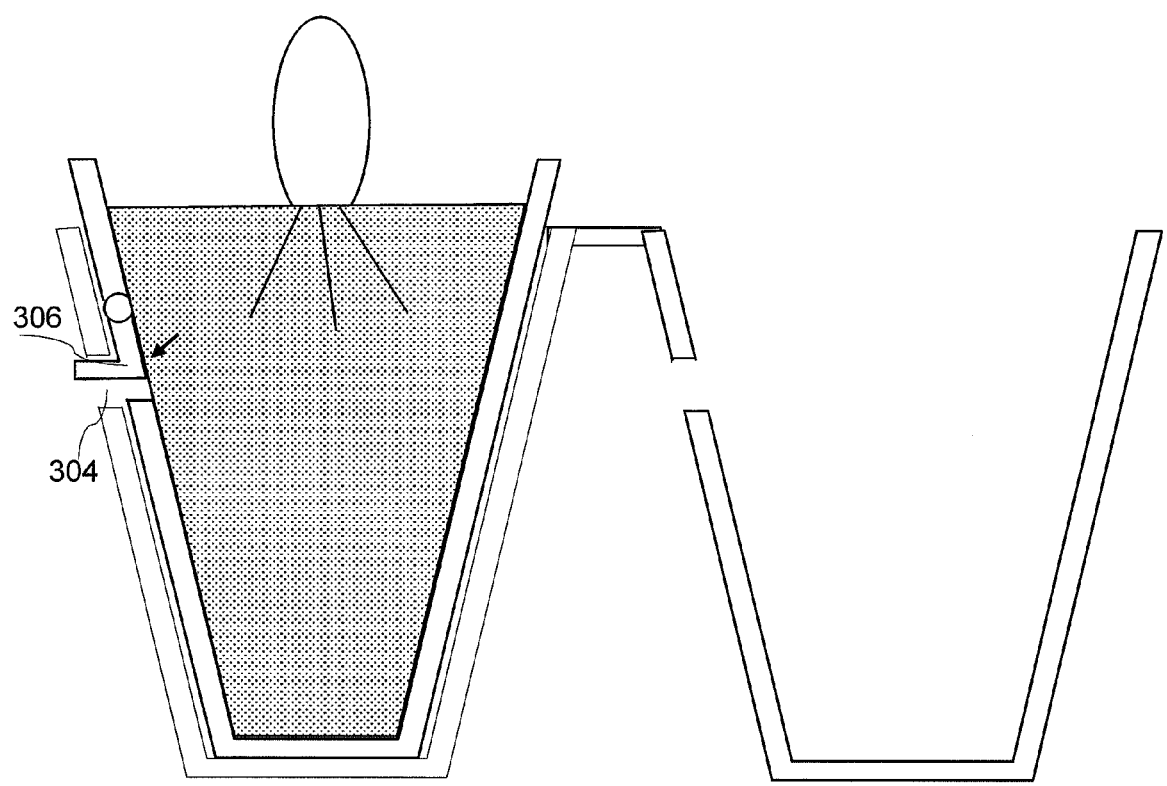

FIG. 12 illustrates the situation when the container is positioned in such as way in the receptacle so that the protrusion of the tab 306 of the container mates with the opening 304 in the tray. The countervailing forces push the tab outwards the container with the protrusion entering opening 304 of the tray. The tab will no longer experience forces pushing it inwards of the container. Accordingly, the protrusion will remain entered in the opening. Because of the shape and the angle of the protrusion in the opening lifting the container out of the tray is now prevented. When the container is lifted vertically out of the tray, the protrusion of the tab hooks onto the wall of the opening in the tray, making vertical movement out of the tray not possible. This "hooking" effect may be enhanced by providing the protrusion an angle of 10 degrees or more relative to the tab.

To facilitate the process of securing the container to the tray, one may enter an empty container into the tray and fill it with soil after the container has been entered and secured by the locking mechanism. One can compact the soil into the container thus helping the protrusion of the tab to be pushed and held into the opening 304.

Figure 13:
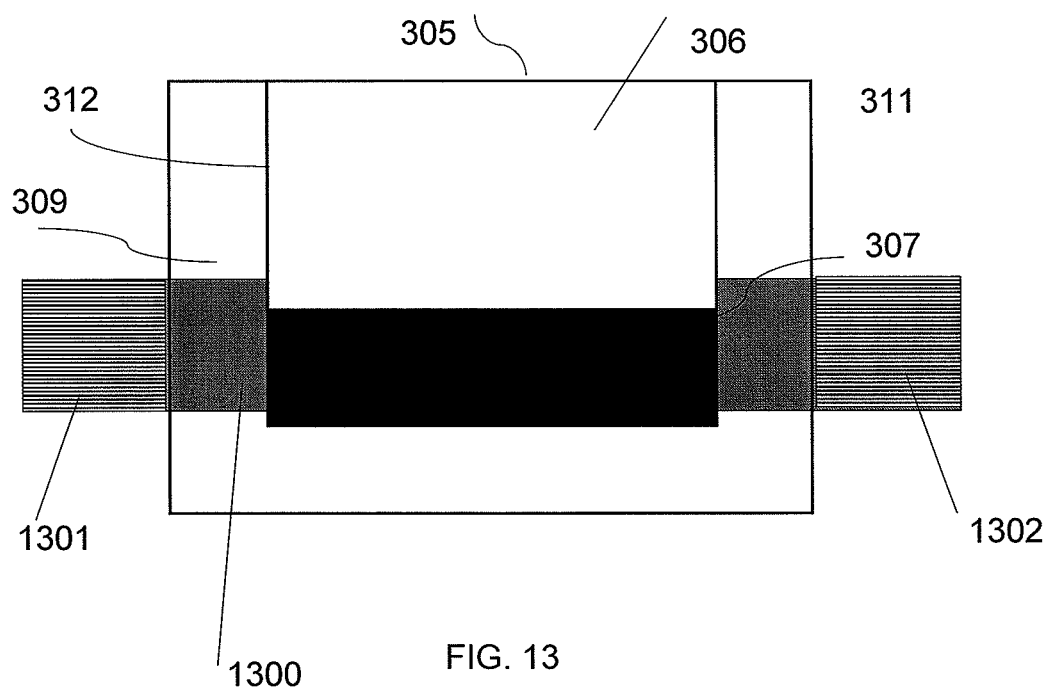
FIGS. 13 and 14 illustrate a locking device on a container in accordance with an aspect of the present invention.

In a further embodiment of the present invention the shape of the protrusion is modified. For instance, the end of the protrusion of the tab of the container that touches the wall of the tray in one embodiment of the present invention is rounded or slanted, so that it slides in an easy fashion over the wall of the tray when the container is entered into the receptacle. In yet a further embodiment of the present invention an elastic stretchable material is attached to the tab and the wall of the container. This stretchable material will force the tab back to its neutral position when it is pushed inwards or outwards of the container. The stretchable material in another embodiment of the present invention is fastened over the opening 309 in the container wall 311 to make pushing tab 306 inwards the container more difficult. This is illustrated in FIG. 13 which is a modified diagram from FIG. 4. A stretchable band 1300 is placed over the opening 309 and attached at the wall 311 at locations 1301 and 1302 at the inside of the wall 311 of the container. The tab 306 can be pushed back into the container by applying some force. As soon as this force disappears the tab 306 and the protrusion 307 are pushed back by the stretchable band 1300. The band 1300 in a further embodiment of the present invention is stapled to the wall 311 of the container. Other ways to attach the band 1300 to the wall of the container are possible and are fully contemplated.

A container shape and a corresponding shape of a tray receptacle for potted plants is shown herein to be tapered, so that the cross sectional area of a container at the top or point of entry to a container is of a larger area than a bottom cross sectional area of the container. This is one embodiment of the container. Not-tapered or straight walled containers and corresponding receptacles in trays are also contemplated.

Figure 14:
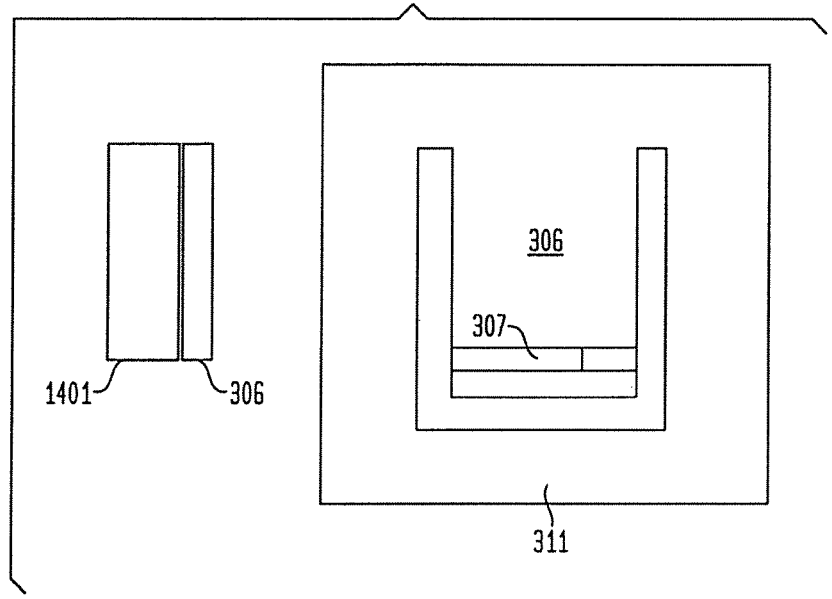
Figure 15:
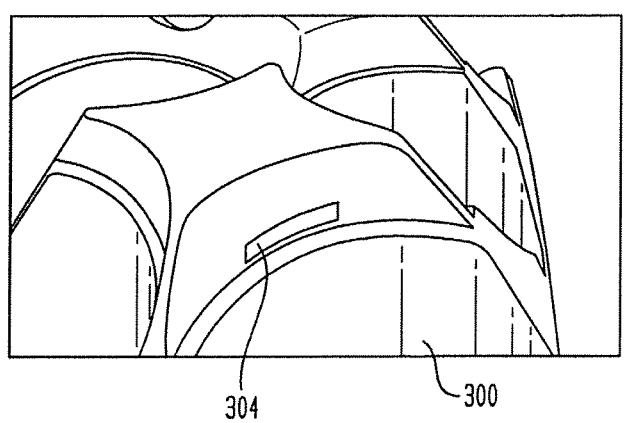
FIG. 15 illustrates a receptacle in a tray in accordance with an aspect of the present invention.

In one embodiment of the present invention the protrusion 1401 of the tab 306 on a wall 311 of a container is substantially rectangular in shape, as is shown in FIG. 14. The sides of the protrusion 1401 being substantially perpendicular to the tab as shown in FIG. 14 will prevent the container from being unsecured, as it is almost impossible to dislodge the protrusion from the opening 304 in a tray receptacle once the protrusion is received therein. In a further embodiment of the present invention the movement of the container is restricted by making the size of slot or opening 304 as close as possible to the size of the protrusion 306. Preferably, slot 304 is somewhat broader and wider than the protrusion to facilitate mating, but not too broad as not to allow significant movement of the container. A tray with a receptacle 300 and a slot 304 is shown in FIG. 15.

It may be desirable to allow a person to remove a secured container from a tray in a non-obvious way. An obvious attempt to remove a secured container from a tray would be to simply try to lift it vertically from the tray. In accordance with an aspect of the present invention the tray and the protrusion of the tab are adapted to allow the secured container that contains a potted plant to be me removed from the tray. This can be achieved in different ways. A preferred way in accordance with an aspect of the present invention is to provide an embodiment of the container with a side of the protrusion of the tab on the wall of the container with a shape that allows the protrusion to be moved out of the opening in the receptacle of the tray when the container is rotated along its vertical axis inside the receptacle. The receptacle in this embodiment of the present invention is adapted to allow the rotation.

Figure 16:
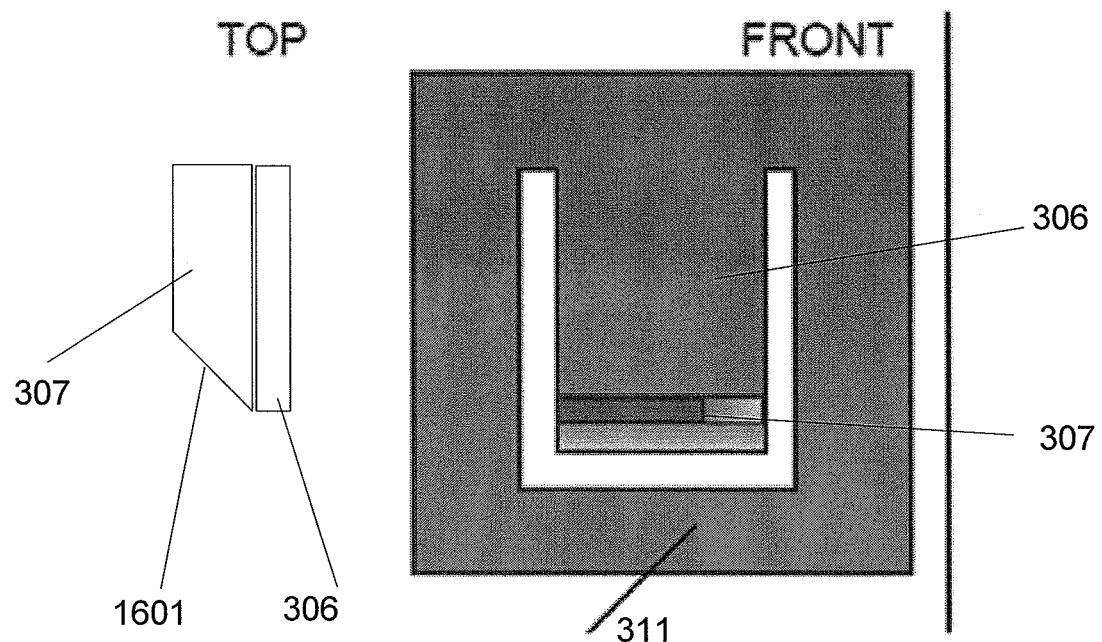
FIGS. 16 and 17 illustrate a locking device on a container in accordance with an aspect of the present invention.
Figure 17:
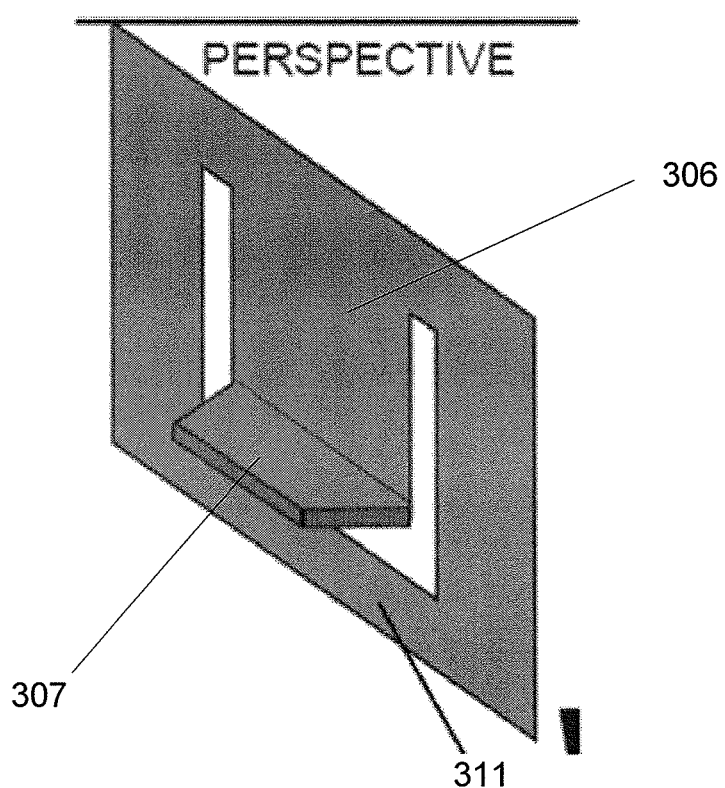

The tab 306 with protrusion 307 that allows removing of a secured container in a tray is illustrated in FIG. 16. The protrusion 307 has a slanted side 1601 that causes the protrusion to be lifted by the wall of the receptacle at the edge of opening 304 from the opening. The modified protrusion on a tab is illustrated in perspective in FIG. 17. It is desirable to create some momentum in rotation of the container. For that reason it is preferred to widen the slot 304 in the receptacle to allow to create some rotational speed to engage the slanted edge of the protrusion with the edge of the wall of the receptacle. The shape of the moving protrusion will lift the protrusion and tab free from the opening, thus allowing the container to be lifted from the tray. The movement of first rotating followed by a lifting movement is non-obvious compared to only vertically lifting of the container.

Figure 18:
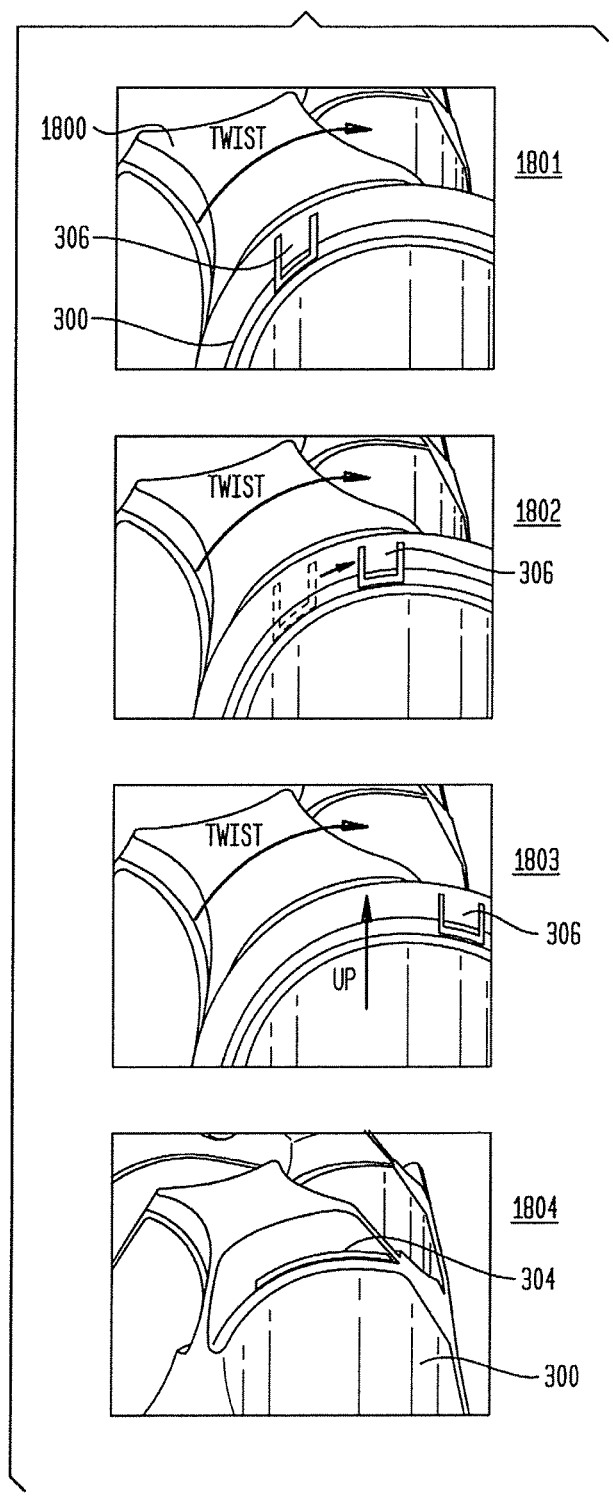
FIG. 18 illustrates disengagement of a secured container from a receptacle in accordance with an aspect of the present invention.

FIG. 18 illustrates a process of removing a secured container from a tray receptacle. Image 1801 shows a container 300 secured by a tab 306 with a protrusion in a slot 304 of a receptacle of a tray 1800. Image 1802 shows the container 300 being rotated clockwise around its axis with the protrusion still in opening 304 of the receptacle. In image 1803 the container has been rotated so that the protrusion is free from the slot 304 and the container can be lifted from the receptacle. Image 1804 shows the empty receptacle 300 with slot 304.

Figure 19:
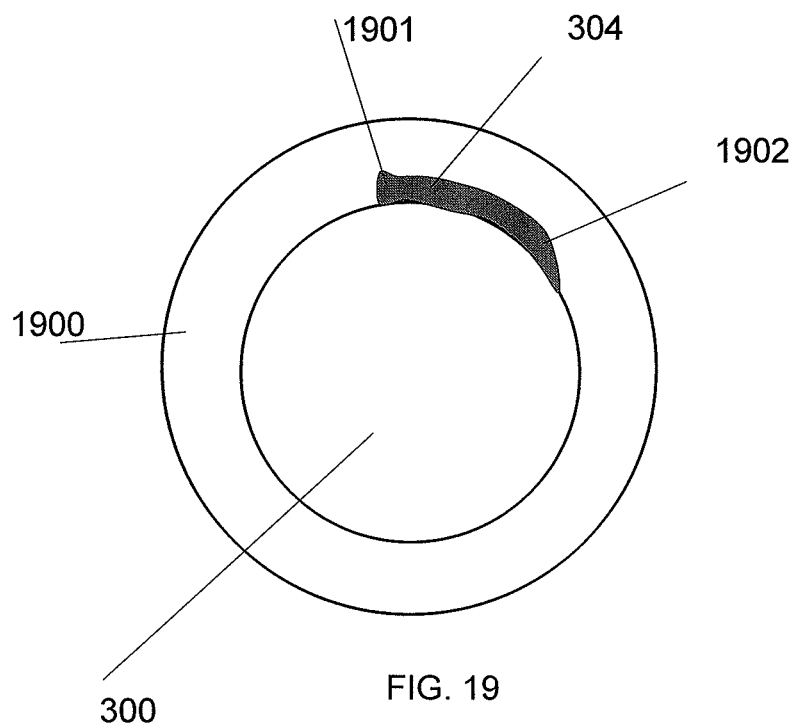
FIG. 19 illustrates in a diagram an opening enabled to receive and release a locking device on a container in accordance with an aspect of the present invention.

It should be clear that different embodiments can be used to lift the protrusion free of the slot 304 so the container can be lifted from the receptacle. FIG. 19 illustrates one embodiment of the present invention wherein a tray 1900 has a receptacle 300 with a slot 304 to receive a protrusion of a tab on a wall of a container. The opening or slot 304 has a first position 1901 that receives the protrusion of the tab to secure the container. The container can be rotated clockwise to put the protrusion beyond point 1902 of the slot 304. The slot is shaped in a manner so it gets shallower near 1902 and to disappear beyond 1902. Accordingly, beyond 1902 there is no longer an opening 304 to capture the protrusion of the tab on the wall of the container and the container is no longer secured in the tray and the container can be lifted out of the receptacle.

The containers containing a potted plant as shown in the figures and corresponding receptacles in a tray are all shown to have a circular horizontal cross section. Having a horizontal cross section is beneficial if an embodiment should allow the removal of a secured container. It should be clear that for the securing aspect of a container in a tray the circular shape is not required. One may secure also containers with potted plants with non-circular cross sections in a non-circular receptacle, for instance with a rectangular horizontal cross-section. In such a case a container can be secured, but it cannot be easily twisted.

It is a further aspect of the present invention that a secured container with a potted plant in a receptacle of a tray closely matches the shape of the receptacle. In a preferred embodiment of the present invention a tolerance of moving the side wall of the secured container in a direction away from the side wall of the receptacle, without rotating or twisting the container is less than the depth of the protrusion of the tab on the wall of the container. Accordingly, it is not possible to remove a secured container from a receptacle of a tray by moving it away in a translating manner from the wall.

Figure 20:
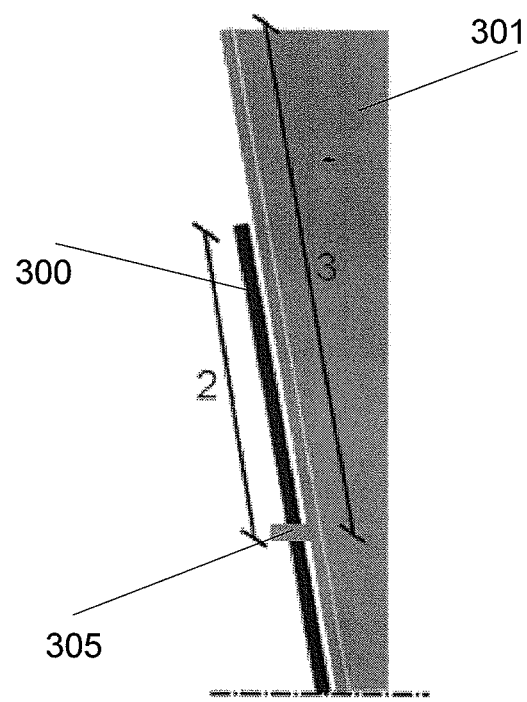
FIG. 20 illustrates a locking device on a container in accordance with an aspect of the present invention.

FIG. 20 provides a diagram an illustrative example of a container 301 secured in a receptacle 300 of a tray and provides illustrative measurements. In one embodiment of the present invention the secured protrusion 305 of a tab on a wall of the container is 3 inches below the top of the container. The opening 304 that receives the protrusion to secure the container in the receptacle of the tray is in one embodiment of the present invention about 2 inches below the top of the receptacle and about 3 inches below the rim of the container as illustrated in FIG. 20.

Figure 21:
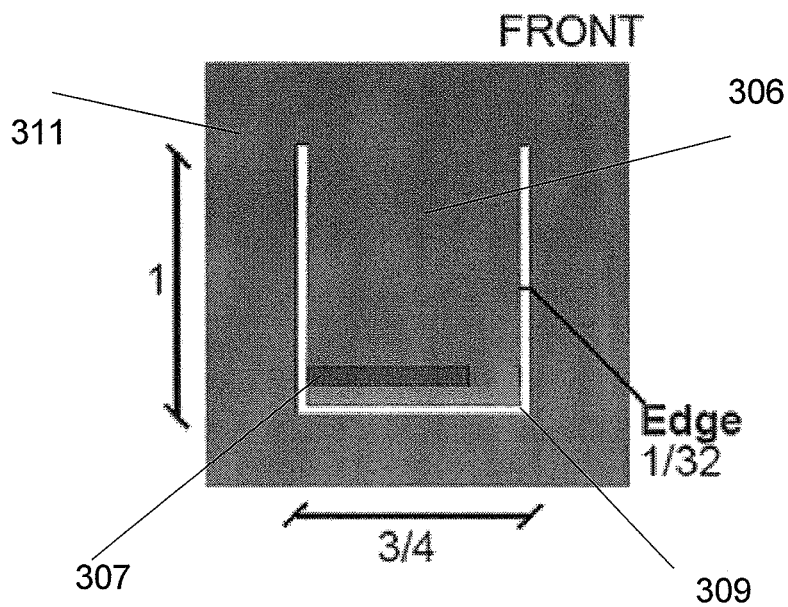
FIGS. 21-23 illustrate a locking device on a container in accordance with an aspect of the present invention.

FIG. 21 provides in diagram in side view an illustrative embodiment of tab 306 with a protrusion 307 in a wall 311 of a container with a potted plant. The tab 306 is cut or stamped or otherwise created in the wall 311 with two vertical edges of a length of about 1 inch and a horizontal edge of about ¾ inch. Space 309 is created between the tab 306 and wall 311 allowing the tab to move inwards and outwards of the container. The space 309 creates a distance of about $\frac{1}{32}$ inch between the edges of tab 306 and the wall 311.

Figure 22:
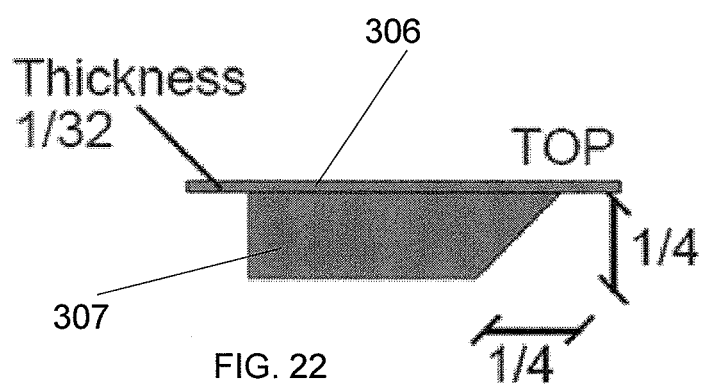

FIG. 22 shows in diagram in top view an illustrative example of an embodiment of the protrusion 307 on the tab 306. The tab has a thickness of about $\frac{1}{32}$ inch. The protrusion 307 is slanted in shape to allow removing a secured container from a tray receptacle. In this embodiment of the present invention only one edge of the protrusion is slanted. The opposite side edge of the protrusion is perpendicular to the tab. The protrusion has a depth of about ¼ inch. The slant is at an angle of about 45 degrees. The slant may also be smaller than 45 degrees. The protrusion has a horizontal projection of about ¼ inch away from the tab.

Figure 23:
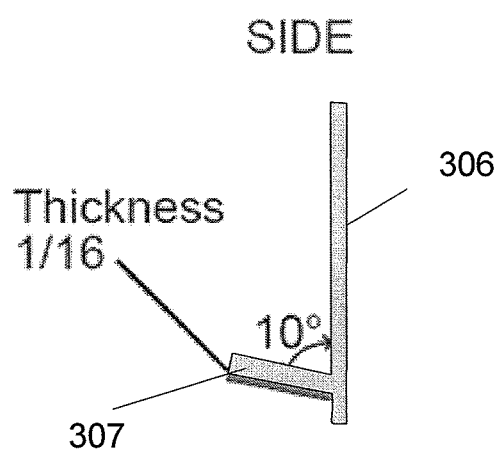

FIG. 23 is a cross sectional diagram of an illustrative example of the tab plus protrusion in side view. The protrusion 307 has a thickness of about ⅛ inch and is attached to the tab 306 under an upward angle of about 10 degrees, allowing the protrusion to hook into a wall of the receptacle of the tray to secure the container with a plant to be secured to the tray.

Figure 24:
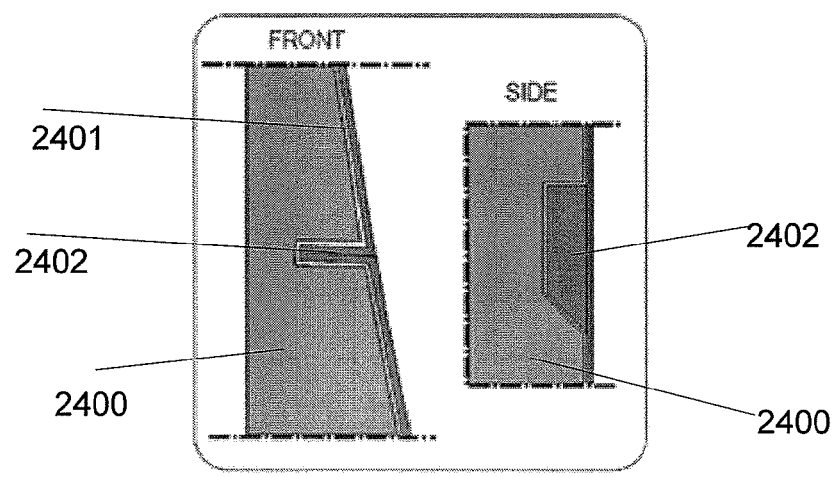
FIGS. 24-26 illustrate a manufacturing of a container in accordance with an aspect of the present invention.
Figure 25:
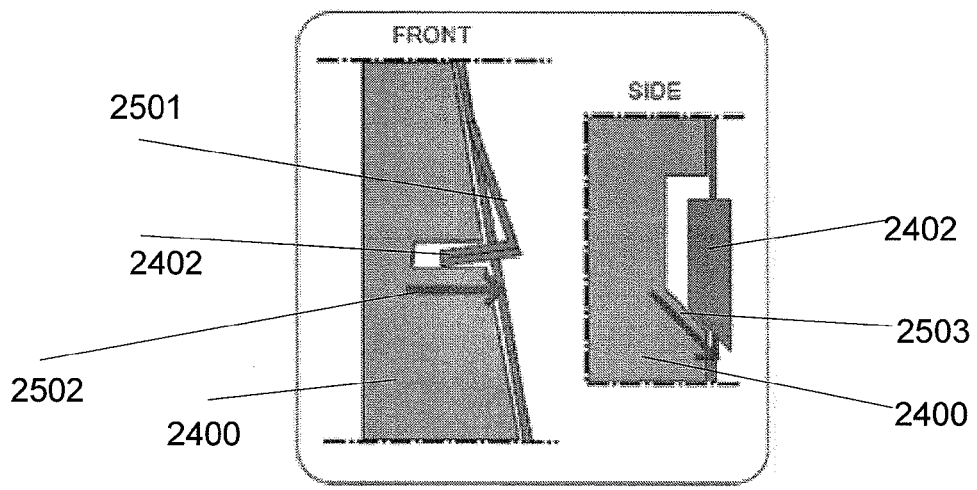
Figure 26:
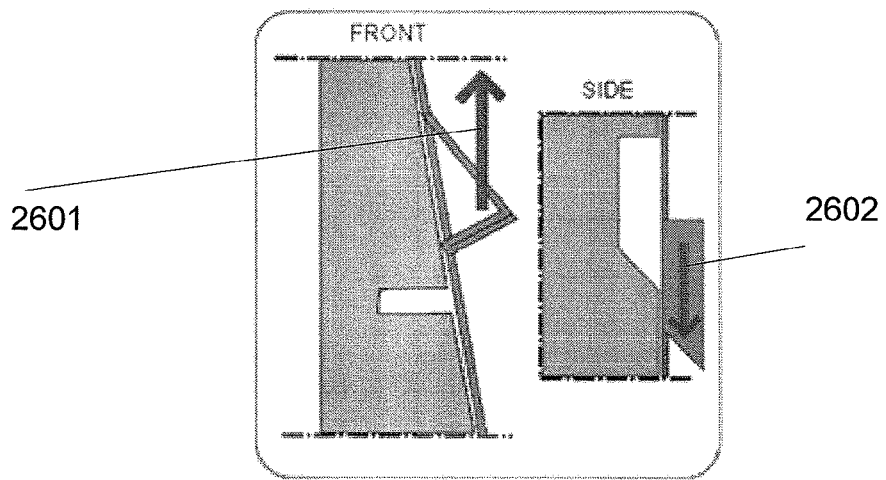

FIGS. 24-26 illustrate in cross sectional view at least one illustrative method for manufacturing a container with a lock. This method applies thermoforming as is known to one of ordinary skill to manufacture a container 2401 with a mould 2400. FIG. 24 shows the container in the mold after being thermoformed from a cross sectional front view and a side view. The protrusion 2402 is also identified. The mould can be structured to create a much thinner container wall or even no material at the edges of a tab, so that a movable tab is present when the container is separated from the mould.

FIG. 25 illustrates how the container may be removed from the mould. Preferably, the thermoformed container sitting in the mould is rotated around a vertical axis so protrusion 2402 is lifted from the mould by the slanted side of the protrusion as is indicated by arrow 2503. Because the protrusion is connected to a tab and the protrusion is moved out of the mould, the tab 2501 will also be lifted from the mould as is indicated by arrow 2502. The tab has already edges that are separate from the wall or the edges are so thin that the forced movement of the container by the lifting of the protrusion will separate tab 2501 on the proper edges from the wall of the thermoformed container.

FIG. 26 illustrates the situation wherein the protrusion is clear from the mould by rotation in direction 2602 and the container can be lifted in direction 2601 to remove the container with a formed lock from the mould.

The above manufacturing process is provided as an illustrative example. Other manufacturing methods using thermoforming or other methods and different types of materials are fully contemplated.

Figure 27:
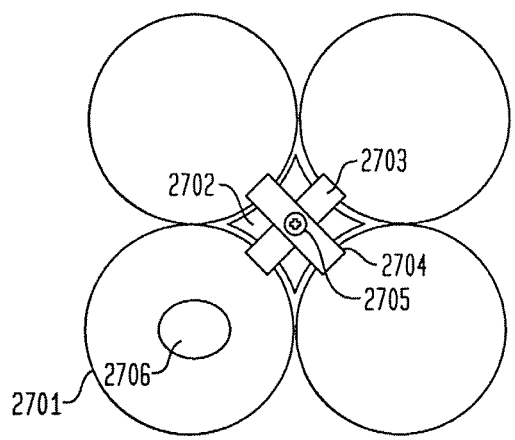
FIGS. 27-29 illustrate a further embodiment of a locking device to secure a container with a potted plant in a tray with a plurality of receptacles in accordance with an aspect of the present invention.
Figure 28:
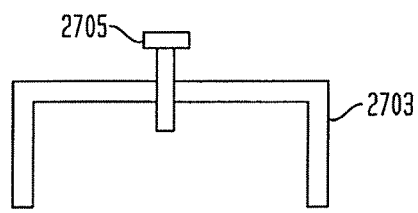
Figure 29:
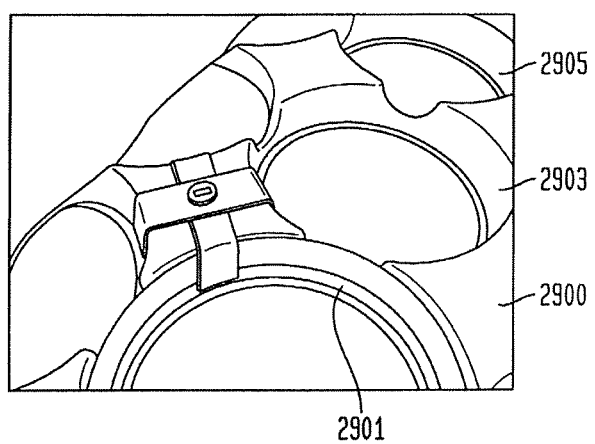

In accordance with a further aspect of the present invention yet another embodiment of the present invention for preventing removing a container with a potted plant from a tray is provided. An illustrative example of this embodiment is provided in diagram view in FIGS. 27-29. A bracket 2703 fastened to a tray 2702 for instance by a screw 2705 is applied to hold a container 2701 with a potted plant 2706 in a receptacle of the tray, as is shown in a top view in FIG. 27. By using two brackets 2703 and 2704 fastened by one screw 4 containers can be secured in 4 receptacles of the tray. FIG. 28 shows a diagram in cross sectional side view of the bracket 2703 with screw 2705. FIG. 29 shows a container 2901 held in a receptacle of a tray 2900 by a bracket 2903 fasted to the tray by a screw or fastener 2905. A consumer may remove the screw at his own convenience at home to release the container from the tray.

Figure 30:
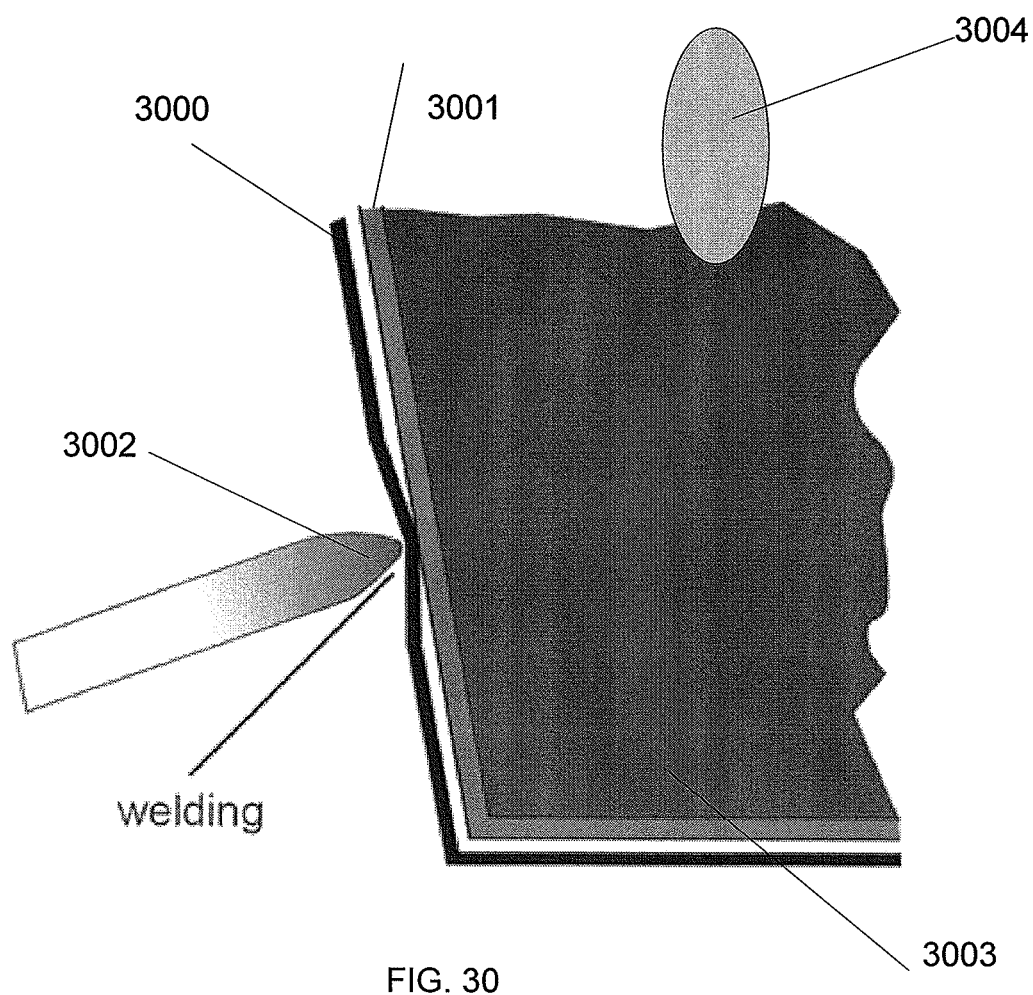
FIG. 30 illustrates yet a further embodiment of a locking device to secure a container with a potted plant in a tray with a plurality of receptacles in accordance with an aspect of the present invention.

In accordance with a further aspect of the present invention yet another embodiment for preventing removing a container with a potted plant from a tray is provided. An illustrative example of this embodiment of the present invention is provided in diagram view in FIG. 30. In this embodiment of the present invention the wall of the tray is welded to the wall of the container. An illustrative example is provided in cross sectional diagram in FIG. 30. A spot welding device 3002 rapidly heats and melts a location of the wall of a tray receptacle 3000 and the wall of a container 3001 with soil 3003 and plant 3004. When the walls are both of a polymer that melts at rapid heating the walls of the receptacle and of the container will be fused after cooling down after heating and the container is fused to the tray. One may also fuse the container to the tray while the container is still empty. By twisting the container the spot weld can be broken to release the container from the tray. Presumably, a consumer will not go through an elaborate effort to break a spot weld to exchange container at a retail location.

Figure 31:
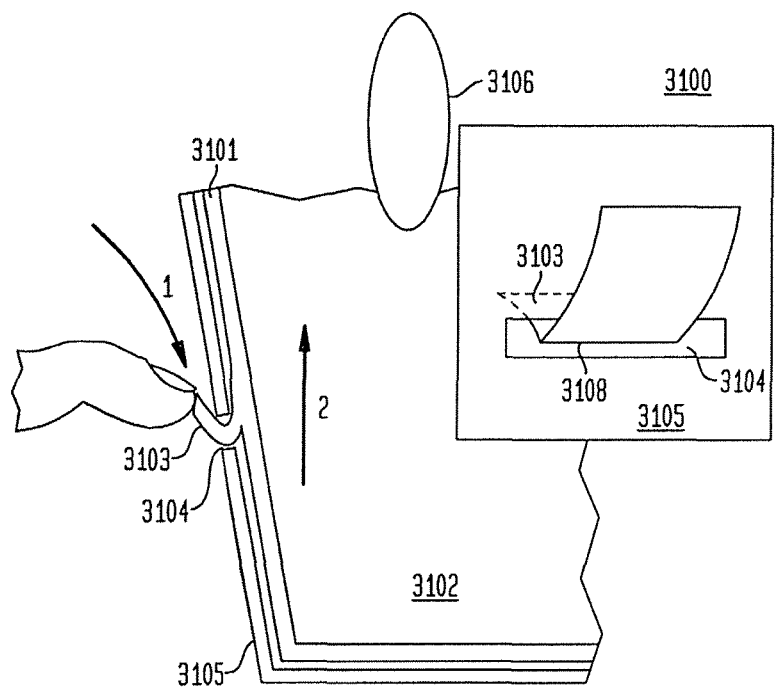
FIGS. 31-32 illustrate yet a further embodiment of a locking device to secure a container with a potted plant in a tray with a plurality of receptacles in accordance with an aspect of the present invention.
Figure 32:
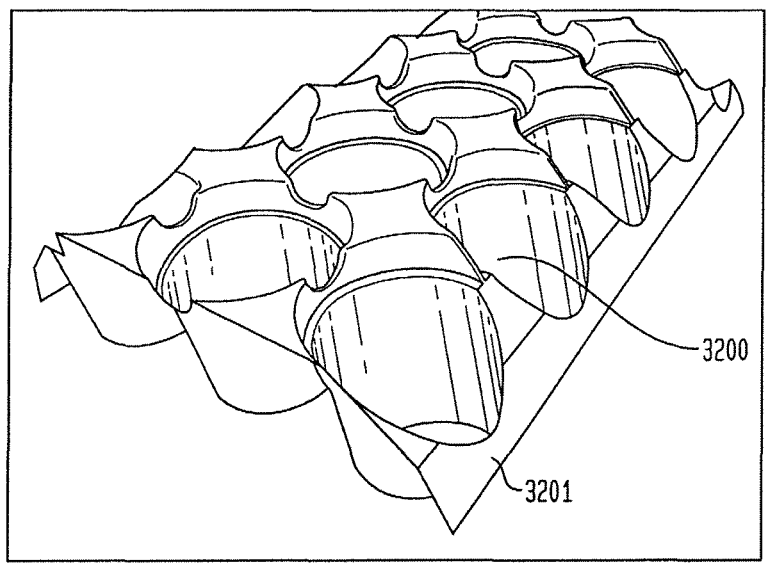

In accordance with a further aspect of the present invention yet another embodiment of the present invention for preventing removing a container with a potted plant from a tray is provided. An illustrative example of this embodiment of the present invention is provided in diagram view in FIG. 31. A container 3101, with soil 3102 and a potted plant 3106 is provided with a flexible tab 3103. A tray has a receptacle 3105 with a slot 3104 enabled to receive the tab 3103 to prevent the container from being removed from the receptacle, which is shown in larger form in 3100. A consumer can remove the container from the tray by moving in a step 1 the tab 3103 back through the slot 3104 and in step 2 lifting the container from the tray. The tab preferably is flexible and is sturdy at its lowest end 3108. In order to release the container only part 3108 has to be pushed back through the slot. Because of the flexibility of 3103 the remainder of the tab can easily be dragged through the slot by lifting the container up. FIG. 32 is an image of a tray 3200. When a container is secured in a receptacle 3201 the tab is only accessible from under the tray.

Figure 33:
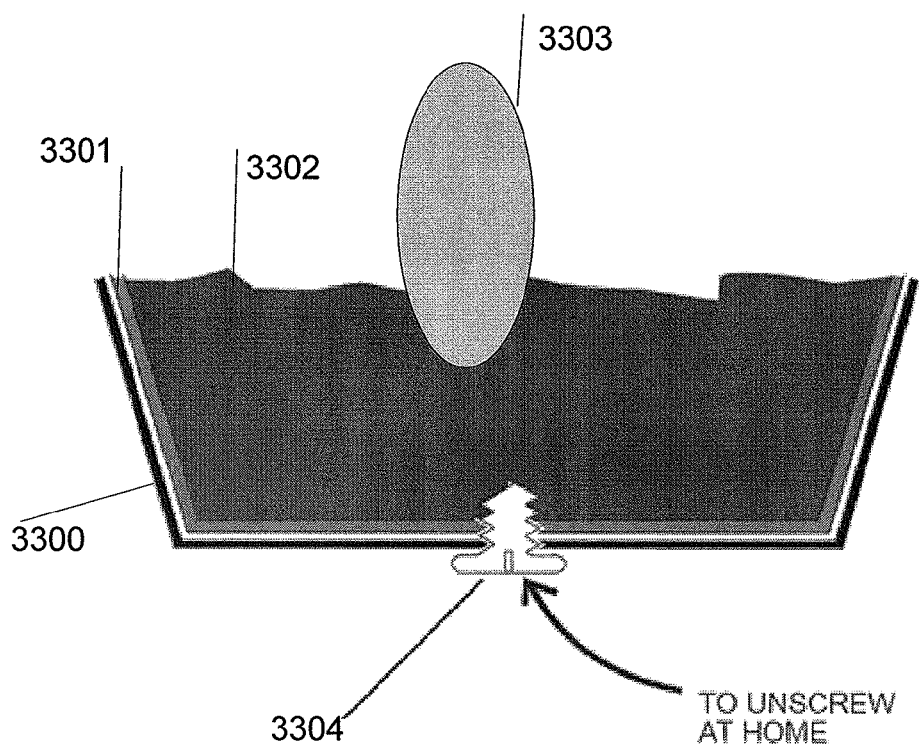
FIGS. 33 and 34 each illustrate yet a further embodiment of a locking device to secure a container with a potted plant in a tray with a plurality of receptacles in accordance with an aspect of the present invention.

In accordance with a further aspect of the present invention yet another embodiment for preventing removing a container with a potted plant from a tray is provided. An illustrative example of this embodiment of the present invention is provided in diagram view in FIG. 33. A receptacle 3300 of a tray secures a container 3301 with soil 3302 and a plant 3303 by way of a screw 3304 which holds together 3300 and 3301 in a secured manner. A consumer may release the container from the tray by unscrewing the screw 3304 from the container.

Figure 34:
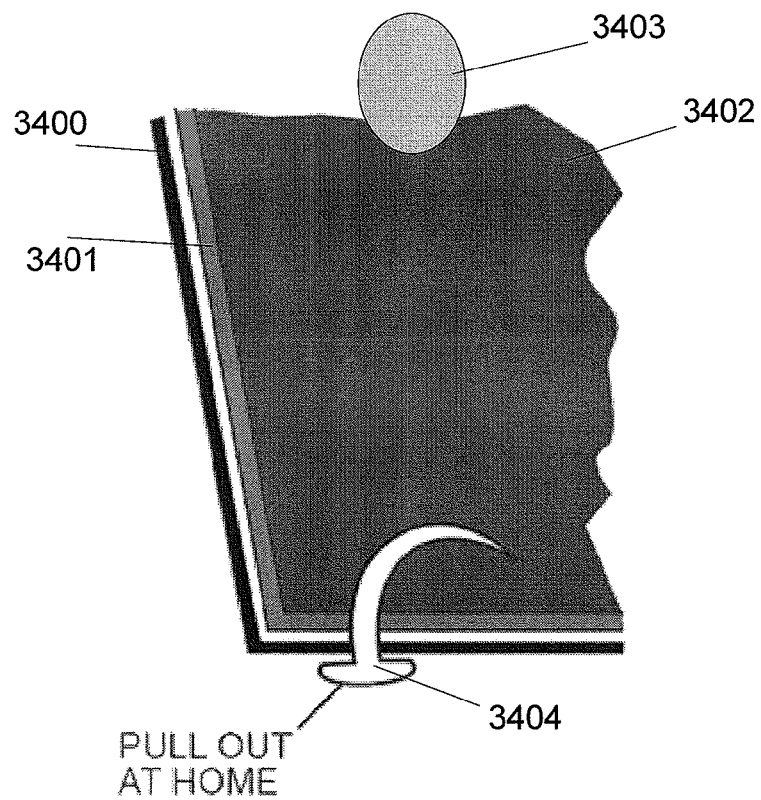

In accordance with a further aspect of the present invention yet another embodiment for preventing removing a container with a potted plant from a tray is provided. An illustrative example of this embodiment of the present invention is provided in diagram view in FIG. 34. A receptacle 3400 of a tray secures a container 3401 with soil 3402 and a plant 3403 by way of a bent nail or pin 3404 which holds together 3400 and 3401 in a secured manner. A consumer may release the container from the tray by removing the bent pin 3404 from the container.

Figure 35:
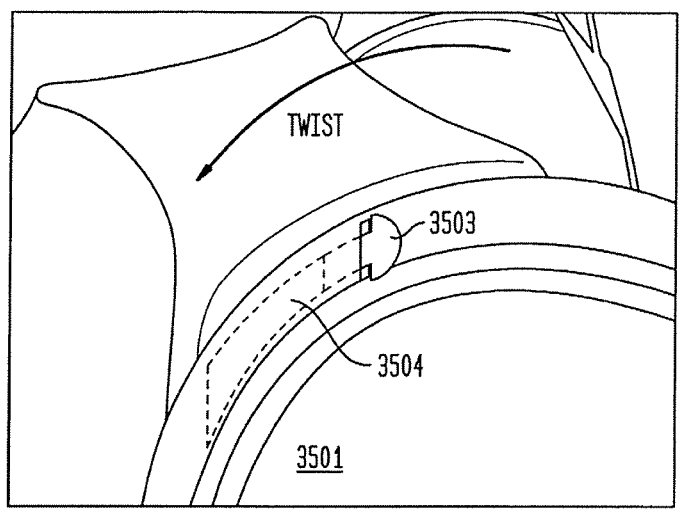
FIGS. 35 and 36 illustrate yet a further embodiment of a locking device to secure a container with a potted plant in a tray with a plurality of receptacles in accordance with an aspect of the present invention.
Figure 36:
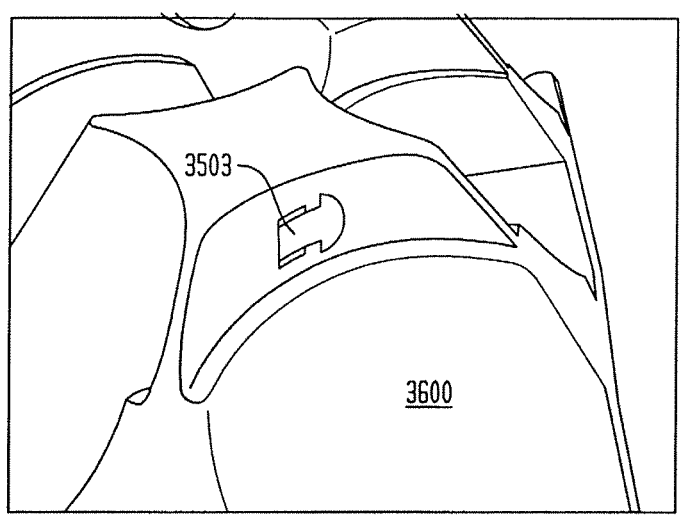

In accordance with a further aspect of the present invention yet another embodiment for preventing removing a container with a potted plant from a tray is provided. An illustrative example of this embodiment is provided in diagram view in FIG. 35. A container 3501 has a slot through which it can receive a tab 3503 which is part of the tray. The container can also have a strip 3504 which can receive the tab 3503. By engaging or hooking the container on the tab 3503, as shown, the container is secured to the tray. If the strip 3504 is used, the container is secured to the tray with additional security. The tab 3503 is further illustrated in FIG. 36 where it is shown as part of a tray receptacle 3600.

As an aspect of the present invention a container with a locking device is provided that can secure a container holding a potted plant in a receptacle of a tray with a plurality of receptacles. The locking device is enabled to be released from the receptacle by moving the container in a non-obvious way. For instance, by first rotating the container around a vertical axis followed by a vertical lift of the container from the receptacle. As another aspect of the present invention a tray is provided which includes a plurality of receptacles, a receptacle being enabled to secure a container with a potted plant by a slot that is enabled to receive a locking device being part of the container to hold the container and to release the locking device to allow the container to be moved from the receptacle. As another aspect of the present invention a combination or a system of a tray with a plurality of receptacles and at least one container with a locking device to secure the container in one of the plurality of receptacles has been provided.

In summary, methods and systems have been provided as different aspects of the present invention that will secure a potted plant in a container in a receptacle of a tray having a plurality of receptacles in a releasable manner. In one embodiment of the present invention the container has a locking device that is an integral part of the container. The locking device in a further embodiment of the present invention is a tab attached to a wall of the container. The tab may cover an opening in the wall of the container. The tab has at least one edge not attached to the wall. This allows the tab to be moved inwards from the wall and outwards from the wall when an inward or an outward force is being applied respectively. The tab has a protrusion placed so that the protrusion faces outwards from the wall of the container. In a neutral position the protrusion on the tab may act as a protrusion on the wall of the container. When the container is moved into a receptacle, the wall of the receptacle applies a force inwards of the container on the protrusion thus pushing the tab and the protrusion towards the center of the container. The container contains soil or other material that opposes the inwards force. For instance, a flexible band fastened on the wall of the container behind the tab may be provided that opposes the inwards force on the protrusion.

When the container is positioned in such a way that the protrusion faces an opening in the wall of the receptacle wherein the opening is larger than the size or cross section of the protrusion, the inward force disappears as the wall of the receptacle can no longer apply a force on the protrusion. The opposing outward force coming from soil or other material inside the container or from a flexible band now moves the protrusion outwards from the container into the opening of the receptacle. By the size and shape of protrusion and by the size of the opening of the receptacle, the protrusion mates with the opening, for instance by hooking behind the wall of the receptacle that defines the opening in the receptacle. And the locking device is now in a secured state in the receptacle, thus securing the container in the receptacle.

The term protrusion is used herein. A protrusion herein is an extension, jut or flange of a tab or fixture to a wall, preferably of a vertical wall or substantially vertical wall or a vertical slanted wall, of a container, preferably a plant container. Rectangular shapes and slanted shapes of the protrusion are provided as illustrated examples in the figures. Other shapes of tabs and protrusions and of corresponding receiving slots are possible and effective and are fully contemplated. The tab with the flange or protrusion can also be characterized as a hook with a substantially vertical part, which is aligned or substantially with the vertical wall or substantially vertical wall of the container in at least a neutral situation and with a substantially horizontal part which protrudes or is oriented outwards from the vertical wall of the container. The hook effect of the hook, which is attached to the vertical wall of the container is demonstrated in its operational use within the pot being placed in a tray with a slot or opening in a vertical wall of the tray aligned with the horizontal part of the hook, the hook being attached to the vertical wall of the container. When the horizontal part of the hook and the slot of the tray are aligned the horizontal part of the hook will enter the slot of the tray. Because of the shape of the horizontal part of the hook and its orientation related to the vertical part of the hook the hook will "hook" into the slot. By vertical lifting of the container the hook will "hook" into slot of the vertical wall of the tray, thus preventing the container from leaving the tray.

While there have been shown, described and pointed out fundamental novel features and aspects of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims appended hereto.

The invention claimed is:

1. A potted plant holder, comprising:
   a tray having a plurality of receptacles, each of the receptacles in the tray having a locking slot in a substantially vertical wall;
   a container enabled to contain a potted plant, the container having a locking device a substantially vertical wall; and
   the locking slot in a first receptacle of the tray enabled to mate with the locking device in the container to secure the container in the first plurality of receptacles;
   wherein the locking device in a neutral position on the container includes a protrusion that protrudes outwards from the container and wherein the protrusion is attached to a movable tab that is attached to the substantially vertical wall of the container.

2. The potted plant holder of claim 1, wherein the movable tab is enabled to move outwards and inwards from an opening in the substantially vertical wall of the container.

3. The potted plant holder of claim 1, wherein the locking slot in the receptacle is an opening enabled to receive the protrusion to secure the container in the receptacle in a secured state.

4. The potted plant holder of claim 1, wherein the container is made of a polymer material.

5. The potted plant holder of claim 1, wherein the tray is made of a polymer material.

6. A potted plant holder, comprising:
   a tray having a plurality of receptacles, each of the receptacles in the tray having a locking slot in a substantially vertical wall;
   a container enabled to contain a potted plant, the container having a locking device a substantially vertical wall; and
   the locking slot in a first receptacle of the tray enabled to mate with the locking device in the container to secure the container in the first plurality of receptacles
   wherein the locking device in a neutral position on the container includes a protrusion that protrudes outwards from the container;
   wherein the locking slot in the receptacle is an opening enabled to receive the protrusion to secure the container in the receptacle in a secured state;
   wherein the protrusion has at least one edge that is slanted at an angle and that enables the protrusion to be lifted out of the opening of the container after the container is rotated about a vertical axis.

7. The potted plant holder of claim 6, wherein the angle is about 45 degrees.

* * * * *